Dec. 16, 1958     A. P. SULLIVAN     2,864,999

VOLTAGE MEASURING INSTRUMENT

Filed Jan. 10, 1956     3 Sheets-Sheet 1

INVENTOR
Alan P. Sullivan
BY
Pennie, Edmonds, Morton, Barrows & Taylor
ATTORNEYS Dec. 16, 1958     A. P. SULLIVAN     2,864,999

VOLTAGE MEASURING INSTRUMENT

Filed Jan. 10, 1956     3 Sheets-Sheet 2

INVENTOR
Alan P. Sullivan
BY
ATTORNEYS

Dec. 16, 1958 A. P. SULLIVAN 2,864,999
VOLTAGE MEASURING INSTRUMENT
Filed Jan. 10, 1956 3 Sheets-Sheet 3

INVENTOR
Alan P. Sullivan
BY
ATTORNEYS

United States Patent Office 2,864,999
Patented Dec. 16, 1958

2,864,999

VOLTAGE MEASURING INSTRUMENT

Alan P. Sullivan, Elizabeth, N. J., assignor to Cities Service Research and Development Company, New York, N. Y., a corporation of New Jersey Application January 10, 1956, Serial No. 558,246

8 Claims. (Cl. 324—98)

This invention relates to voltage measuring apparatus, and more particularly to an instrument adapted to measure small changes in direct current voltage of the type and amount measured in the evaluation of corrosion inhibitors used in the protective treatment of oil production and collection equipment.

In conventional oil production operations, the oil is generally mixed with fluids commonly known as brines which are often extremely corrosive in character and cause considerable damage to equipment. Experience has shown that the corrosiveness of the brine can be minimized and, in many situations, substantially inhibited by incorporating in the well a small amount of a chemical reagent known as a corrosion inhibitor which in some way protects the metal surfaces with which it comes in contact.

Since the corrosive conditions vary widely from field to field, and often from well to well, a method of evaluating the corrosion inhibitor best suited for minimizing corrosion in a particular well is most desirable. Such a method is described in the copending application of William B. Hughes, Serial No. 490,645, filed February 25, 1955. The method of evaluating corrosion inhibitors described therein is based on the discovery that if two metallic test strips of the same composition are suspended in a brine of the type commonly found in oil wells, a voltaic cell is created, the characteristics of which can be measured. If one of the metallic test strips is then coated with a corrosion inhibitor and replaced in the brine, a change in the previously measured characteristic will result. This result, which may be represented as a numerical value, will then be a comparative measure of the effectiveness of the corrosion inhibiting material for the particular conditions existing in the cell.

The voltages produced in such a system are in the order of millivolts, and, in accordance with the present invention, are preferably measured by a null method in which no current is drawn from the cell formed by the brine and metallic samples. Since it is desirable to evaluate inhibiting materials under field conditions, a portable and rugged instrument, less expensive than laboratory potentiometers, is desirable.

Presently available potentiometers, however, of a portable type which may operate according to the null method, do not include means for compensating for initial voltage generated between untreated test strips. Moreover, presently available potentiometric equipment is generally limited to use in temperatures above 32° F. by reason of the incorporation therein of a standard cell.

It is accordingly an object of the present invention to provide a voltage measuring instrument of the potentiometric type having incorporated therein means for compensating for initial voltage generated between untreated test strips in the voltaic cell.

It is a further object of the present invention to provide a portable, inexpensive voltage measuring instrument capable of field use at temperatures below freezing.

It is a further object of the present invention to provide a voltage measuring apparatus having incorporated therein means for adjusting to currents of small voltage and varying polarity.

These and other objects and advantages of the present invention will be apparent from the description which follows.

An embodiment of the invention is schematically illustrated in the accompanying drawings, in which Fig. 1 is a schematic diagram of an embodiment of the invention;

Figure 1:
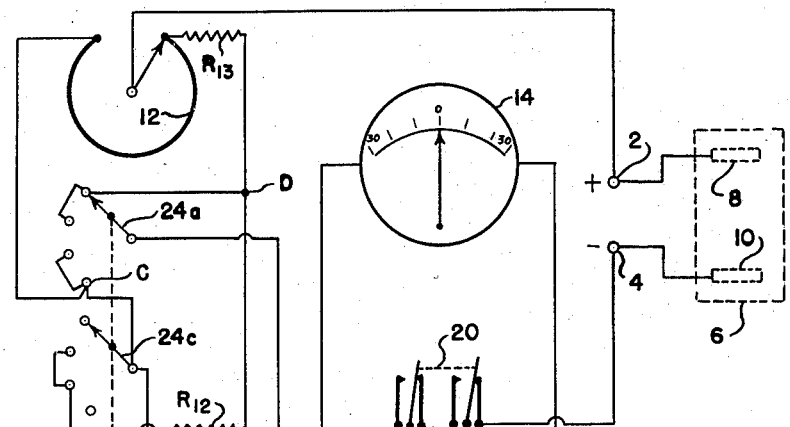

In Fig. 1 terminals 2 and 4 are the terminals of the instrument between which is connected the voltage to be measured, typically a cell comprising a solution of salt or salt-containing oil well fluids and a pair of electrodes preferably of identical composition and the same or substantially the same size and shape. Such a cell is generally indicated in the drawing in dashed lines at 6. Immersed to the same depth in a salt-containing solution in the cell are two electrodes 8 and 10 of the same composition and shape. Terminal 2 is identified in the drawings as positive with respect to terminal 4 for reasons which will presently appear.

The device shown in the drawings makes possible the development between terminals 2 and 4 of a measurable voltage equal to the change in voltage between electrodes 8 and 10 occurring when one of these electrodes, preferably the electrode 8, is coated with a corrosion inhibiting material. The value of this change in voltage is read from a potentiometer 12 when a galvanometer 14 as connected in series with terminals 2 and 4 gives zero current indication.

For the development of the voltage required for measurement of the voltage change in the cell, the circuit includes a D. C. potential source in the form of a battery 16. In practice this may conveniently take the form of a 1½ volt dry cell for flashlight use. In series with the cell 16 there is connected a rheostat 18 whose function is to compensate for changes of output voltage from the cell 16 with age. The rheostate 18 is adjusted to cause the battery to deliver a standard value of current (measurable with galvanometer 14) and hence to develop a standard difference of potential between a pair of circuit terminals identified at A and B. For this purpose there is provided a double-pole double-throw switch 20 by means of which the galvanometer can be connected, in series with a current-limiting resistor $R_1$, across the combination of a resistor $R_2$ and a calibration shunt resistor $R_3$. For this standardizing operation the switch 20 is moved to the left as shown in the drawings. The circuit is so designed that the resistance between terminals A and B is independent of the setting of the multiposition, multicontact switch 24a—24f which, with an on-off switch 26 in series with the battery, is the only switch in the circuit beside the meter switch 20.

With the rheostat 18 properly adjusted, the current flow from the cell toward the terminal A possesses a standardized value and similarly the current flowing toward the cell from terminal B possesses the same value. The remainder of the circuit is designed to deliver other standardized values of current through the voltage change measuring potentiometer 12 and through a compensating potentiometer 22 which is provided to compensate for (and incidentally to measure) the initial voltage difference between electrodes 8 and 10 when neither has been treated with a corrosion inhibiting material.

In view of the fact that the change of voltage produced by the application of a corrosion inhibitor to one of the electrodes in cell 6 may be in either direction, a reversing switch is provided in order that this net voltage change may be measured on the potentiometer 12 from the same zero point, i. e. from the same end of the potentiometer winding. This reversing switch comprises switches 24a and 24b which permit interchanging the electrical connection of terminals C and D with terminals B and E, respectively. As more readily perceived from the equivalent circuit of Fig. 2, switch element 24a connects terminal B with terminals D or C, and switch element 24b connects terminal E with terminals C or D. Terminal E is separated from terminal A by a dropping resistor $R_{11}$ and, for one of the ranges of voltage measurement provided by the instrument (as controlled by switch element 24d) by an additional dropping resistor $R_{10}$.

In a preferred form of the invention illustrated in Fig. 1 the reversing switch comprising switch elements 24a and 24b is moreover associated via a mechanical linkage with switch elements 24c—24f which provide the instrument with two ranges of voltage measurement. In one form of instrument according to the invention which has been successfully constructed, ranges of 100 and 200 mv. were provided. These switch elements 24c, 24d, 24e and 24f are mechanically linked with switch elements 24a and 24b to provide any one of two positive and two negative ranges of voltage change, positive ranges being identified as those for which the electrode connected to terminal 2 becomes more positive with respect to the electrode connected to terminal 4 and vice versa. The effect of the range selector switch elements 24c—24f is to select one or another standard current value through the potentiometer 12, while keeping unchanged the total current drawn from the battery and, in a preferred embodiment, keeping unchanged the currents in separate branches connected across terminals A and B which contain the slidewire potentiometers 12 and 22. The current through potentiometer 22 may be the same for both ranges of voltage measurement, so that for both ranges compensation can be made for the same maximum initial voltage applied between terminals 2 and 4.

An on-off switch 26 controls flow of current from the cell 16 and hence the condition of energization of the entire apparatus. The position of switches 24a—24f shown in Fig. 1 is that which provides the higher range of positive voltages between terminals 2 and 4 for balancing with the voltage change produced in the test cell 6. This range of voltages is defined by the current flowing through the winding of potentiometer 12.

Figure 2:
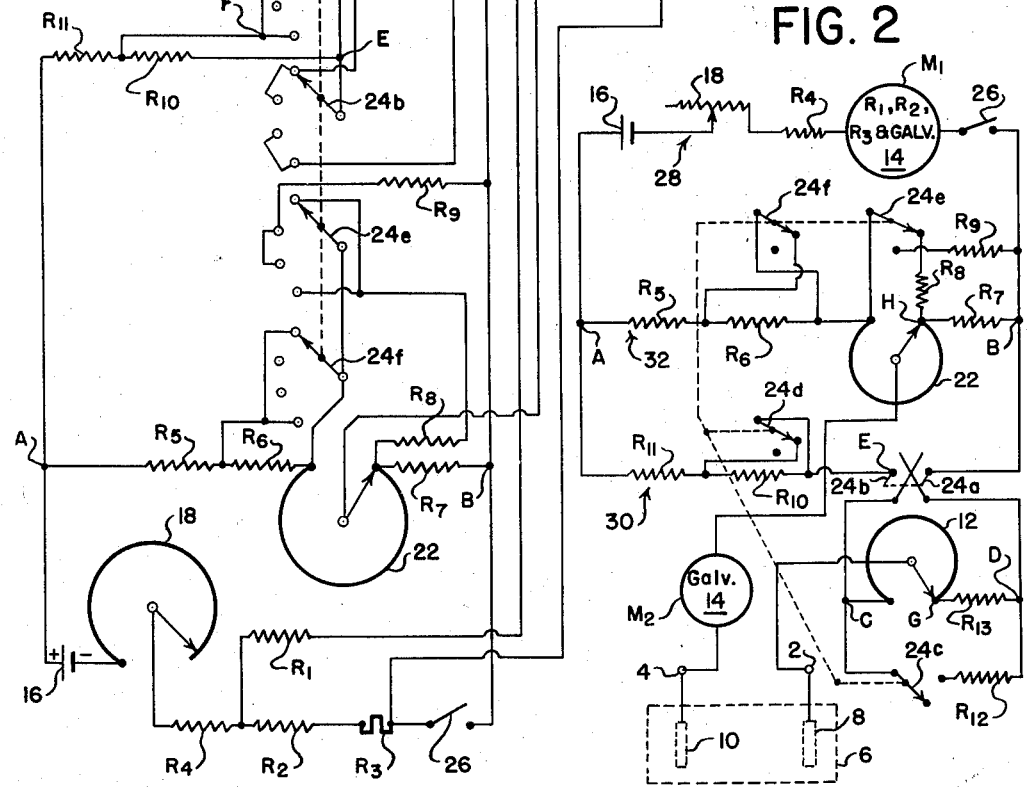
Fig. 2 is a schematic diagram representing essentially the same circuit as that of Fig. 1, redrawn for greater ease of understanding.

The instrument of the invention may be more readily understood from a consideration of the equivalent circuit diagram thereof given in Fig. 2 and from a consideration of Figs. 3–6 which are diagrams simplified from that of Fig. 2 for the four different configurations of which the embodiment of the invention illustrated in Figs. 1 and 2 is susceptible.

The diagram of Fig. 2 is the same as that of Fig. 1 except that a meter $M_1$ in Fig. 2 replaces galvanometer 14 together with its associated resistors $R_1$, $R_2$ and $R_3$ for the position of the switch 20 which connects galvanometer 14 in series with $R_4$ and except that a meter $M_2$ designates galvanometer 14 alone as connected by switch 20 in series with the leads to the instrument terminals 2 and 4. The battery 16 is seen to be connected into a first branch generally indicated at 28 which includes the standardizing rheostat 18, resistor $R_4$, meter $M_1$ and switch 26. Across the terminals A, B of this branch there are shown in Fig. 2 second and third branches generally indicated at 30 and 32.

Branch 30 includes a series combination comprising the voltage-measuring potentiometer 12 and resistor $R_{13}$ (reversibly insertable via reversing switch 24a, 24b), and a resistor $R_{11}$. For the position of the range-changing switches shown in Figs. 1 and 2 a resistor $R_{10}$ is shorted out and resistor $R_{12}$ is left out of circuit. In the other position of the range-changing switches $R_{10}$ is inserted in series with $R_{11}$ and $R_{12}$ is placed in parallel with potentiometer 12 and $R_{13}$ in series. The third branch generally indicated at 32 includes the compensating potentiometer 22 and resistors $R_5$ and $R_7$. For the setting of the range-changing switches shown in Figs. 1 and 2 a resistor $R_6$ is shorted out and a resistor $R_8$ is placed in parallel with potentiometer 22. In the other position of the range-changing switches $R_6$ is placed in series with $R_5$, potentiometer 22 and $R_7$ while $R_9$ is connected across potentiometer 22 and $R_7$ in series, $R_8$ being left out of circuit.

Resistors $R_5$—$R_{13}$ establish desired currents in potentiometers 12 and 22, different (for potentiometer 12) for the two ranges, while maintaining unchanged the total current drawn from the battery and, preferably the individual currents in branches 30 and 32. These resistors also make the junction of potentiometer 22 and $R_7$ and the junction of potentiometer 12 and $R_{13}$ points of equal potential for both ranges of voltage measurement and for both positions of the reversing switch.

Figure 3:
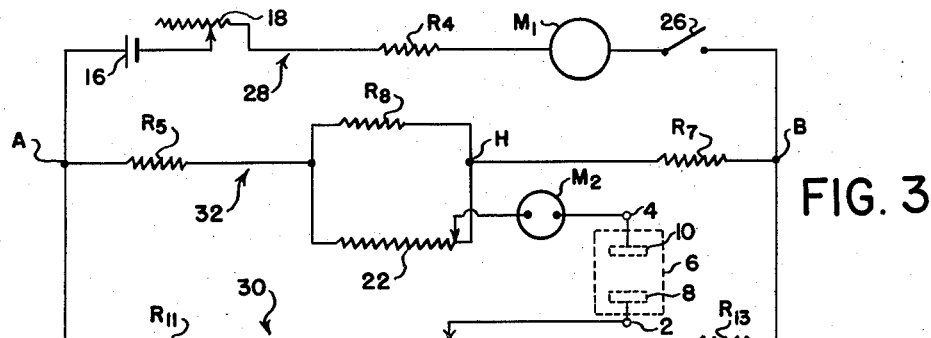
Figs. 3–6 are diagrams showing circuits equivalent to that of Figs. 1 and 2 for particular conditions of switching.

The four configurations of the circuit of Fig. 2 achievable with switches 24a—24f are illustrated in Figs. 3–6. Fig. 3 represents the configuration of the circuit of Fig. 2 with reversing switch 24a, 24b in the position which separates the measuring potentiometer 12 from terminal B by resistor $R_{13}$ and with range switches 24c—24f in the position shown in Fig. 2. This provides the higher range of voltages measurable with the instrument and, with the polarity shown for battery 16, it is the condition of the reversing switch which enables the instrument to measure voltages between terminals 2 and 4 which make terminal 2 positive with respect to terminal 4 or alternatively, changes in voltage which make terminal 2 more positive than before although the absolute difference of potential between terminals 2 and 4 may nonetheless leave terminal 2 negative with respect to terminal 4.

In Fig. 3 the branch 32 is seen to contain resistors $R_5$ and $R_7$ (resistor $R_6$ being shorted out by switch 24f), and two parallel sub-branches one of which includes compensating potentiometer 22 and the other of which contains resistor $R_8$, connected in parallel with that potentiometer by switch 24e. Branch 30 contains resistor $R_{11}$, the measuring potentiometer 12 and resistor $R_{13}$. Resistor $R_{10}$ is shorted out by switch 24d and resistor $R_{12}$ is left out of circuit by the open condition of switch 24c. The resistors are so proportioned that a known current flows through the measuring potentiometer 12 and another known current flows through the compensating potentiometer 22.

Figure 4:
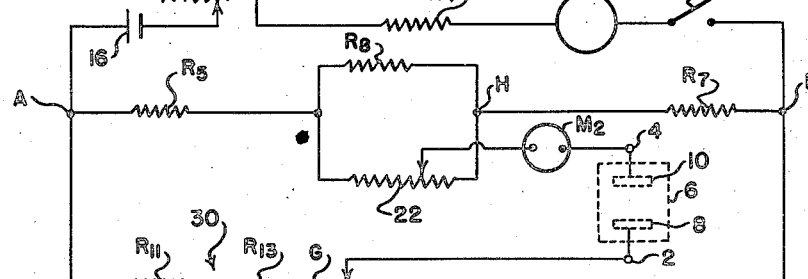

The configuration of Fig. 4 is the same as that of Fig. 3 except that the series connection of potentiometer 12 and $R_{13}$ has been reversed end for end by the reversing switch. The configuration of Fig. 4 permits measurement of voltages and voltage changes of the same range of magnitudes as does that of Fig. 3 but of opposite polarities with respect to the application thereof to the instrument terminals 2 and 4.

Figure 5:
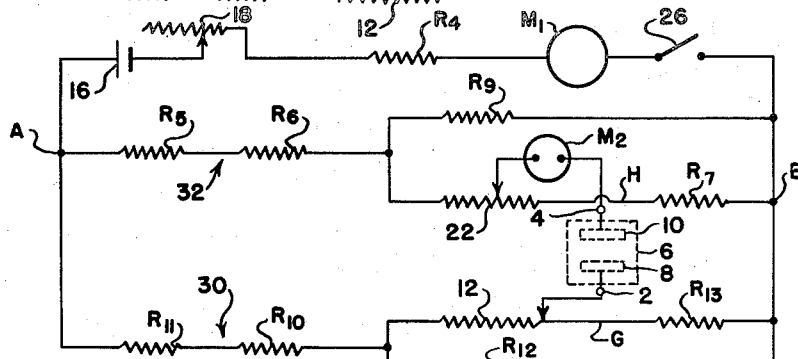
Figure 6:
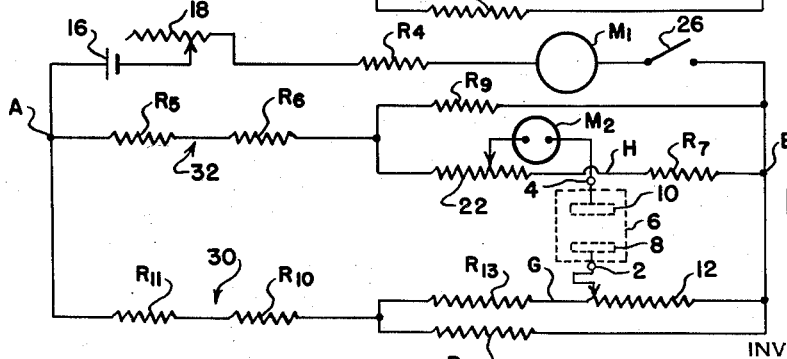

The configuration of Fig. 5 permits measurement of voltages and voltage changes applied to terminals 2 and 4 in the same polarity as does Fig. 3, but with a smaller maximum value and hence with a higher precision. Here $R_6$ has been inserted into branch 32 by opening of the switch 24f, and one sub-branch of branch 32 contains $R_9$ while the other includes the series combination of potentiometer 22 and $R_7$. In branch 30 $R_{10}$ has been inserted in series with $R_{11}$ by opening of switch 24d, and closing of switch 24c has inserted $R_{12}$ in parallel with the series combination of $R_{13}$ and potentiometer 12, i. e. in parallel with the terminals of the reversing switch. By means of these circuit changes the current through measuring potentiometer 12 is reduced while that through potentiometer 22 is maintained unchanged, to permit measurement of lowered maximum voltages at potentiometer 12 and compensation of the same range of initial voltages at potentiometer 22. The configuration of Fig. 6 bears the same relation to that of Fig. 5 as does the configuration of Fig. 4 to that of Fig. 3.

As has been stated in connection with the description of Fig. 1, the switches 24a—24f which are separately shown in Fig. 2 and whose operation establishes the various configurations of Figs. 3–6 are advantageously ganged together as indicated in Fig. 1 into a single four-position switch or control. The four positions shown in Fig. 1 reading from top to bottom correspond respectively to the configurations of Figs. 3, 5, 4 and 6.

It is a feature of the invention that the change in potential from terminal B to the end of compensating potentiometer 22 adjacent thereto is the same as the change in potential from terminal B to the junction between measuring potentiometer 12 and $R_{13}$ which is connected in series therewith between terminals C and D of the reversing switch—for all switching configurations, including in particular both positions of the reversing switch. This means of course that, labeling this junction G for convenience, the total resistance between C and G must equal the total resistance between G and D. In terms of the embodiment illustrated therefore the resistance of potentiometer 12 equals that of $R_{13}$.

The dials coupled to the sliders on potentiometers 12 and 22 are moreover so established that potentiometer 22 reads zero when its slider is nearest terminal B and so that potentiometer 12 reads zero when its slider is at the junction G. Hence with both dials set at zero, the instrument develops zero output voltage at terminals 2 and 4, regardless of the setting of the reversing switch.

With this construction and with potentiometer 22 set at zero, voltages of either polarity applied to the instrument terminals 2 and 4 may be measured, i. e. balanced out, by adjustment of the measuring potentiometer 12. If the voltage applied, e. g. by a cell 6, makes terminal 2 positive with respect to terminal 4, and if the battery 16 is connected with the polarity shown, measurement will be made with the setting of the reversing switch corresponding to Fig. 3 (or Fig. 5) in which potentiometer 12 is between junction G and terminal A at the positive pole of the battery. On this convention terminal 2 may be described as the positive terminal of the instrument, and the voltage ranges measurable with the configurations of Figs. 3 and 5 may be referred to as positive voltage ranges.

Conversely of course if the external source of potential difference is connected to make terminal 4 positive with respect to terminal 2, measurement of such a voltage must be made with the opposite setting of the reversing switch (corresponding to Figs. 4 and 6) and the voltage ranges measurable with this position of the reversing switch may be called negative voltage ranges.

As has been indicated, the accuracy of the voltages so measured depends upon the maintenance in branches 30 and 32 of specified currents with reference to which the dials coupled to potentiometers 12 and 22 are calibrated. Before voltage measurements are made therefore, in order to preserve correspondence between the calibration of these dials and the voltages actually tapped from their sliders, the current flowing in branch 28 should be brought to the correct value by a "standardizing" adjustment made with the rheostat 18. The value of this current of course depends upon the constants of the circuit. This adjustment should be made with the instrument terminals 2 and 4 open circuited, but in a preferred embodiment of the invention the resistance of each of the branches 30 and 32 is the same for all switching configurations so that the standardizing adjustment may be made for any position of switches 24a—24f, it being understood that switches 24c—24f and also for convenience switches 24a and 24b are ganged together as indicated in Fig. 1.

The instrument however is primarily designed for rapid and easy, direct reading measurement of a change of voltage from an initial value different from zero, the change being in either direction so that without a direct reading instrument it would be necessary to take the difference between two numbers which may be of opposite algebraic sign.

For the measurement of such a voltage change the external source of potential difference, such as the cell 6 with untreated electrodes 8 and 10, is connected to the instrument terminals 2 and 4 in such polarity that, with the measurement potentiometer 12 set at zero, the voltage output from the source 6 may be balanced out to produce a null reading on the galvanometer 14 by adjustment of the compensating potentiometer 22. This setting of potentiometer 22 may if desired be used as a measure of the value of the voltage output from the source 6. For such reading the galvanometer is connected in series with the leads to terminals 2 and 4 by switch 20 (Fig. 1) to function as the meter $M_2$ of Figs. 2–6. This connection of the source will be that which makes terminal 4 positive with respect to terminal 2. If the source is now changed, as by treatment of one of the electrodes 6 and 8 with a corrosion inhibitor, the change in voltage can be directly read from the instrument by adjusting potentiometer 12 to obtain again a null reading on the galvanometer. If the change is such as to make terminal 2 more positive than before with respect to terminal 4, whether or not the polarity of the potential difference between the two terminals changes, the change will be read by adjustment of potentiometer 12 away from its zero position with the positive setting of the reversing switch, i. e. in the uppermost or second uppermost of the four positions shown in Fig. 1 for the ganged switches 24a—f. If instead terminal 2 has through the change in the applied source become more negative with respect to terminal 4, the change will be measured by adjustment of potentiometer 12 away from zero with a negative setting of the reversing switch, corresponding to one of the third and fourth positions from the top shown in Fig. 1 for the ganged switches 24a—24f.

Such direct reading of a change of voltage in either sense from an initial value is made possible in the instrument of the invention by virtue of the fact that the end of the compensating potentiometer from which zero compensating voltage is measured (identified as junction H in Fig. 2) is at equipotential with the junction G of the measuring potentiometer 12 and its equivalued series resistor $R_{13}$, branches 30 and 32 being dimensioned so that the potential changes from terminal B to junctions G and H are equal. Otherwise stated, the potential changes from the terminal of battery 16 adjacent to terminal B to junctions G and H are equal. Moreover this relationship is preserved in the instrument of the invention on all voltage ranges provided, consistently with preservation of constant total current drawn from the battery and preferably with constant currents in each of the measuring and compensating branches. Thus upon passage from the high to the low voltage range, the drop in resistance between terminals C and D of branch 30 produced by application of $R_{12}$ across those terminals is exactly compensated as to the total resistance of the branch by the simultaneous insertion of $R_{10}$. The equipotential relationship of junctions G and H is preserved upon range change, in the embodiment shown, by effectively inserting a portion of $R_9$ in parallel with $R_7$. Equivalently $R_8$ might be left in parallel with potentiometer 22 on both ranges, and a resistor of reduced value might be placed in parallel with $R_7$ alone for the lower range in place of the arrangement with $R_9$ shown. To compensate for the reduced resistance between junction H and terminal B, $R_6$ is inserted in branch 32 on the opposite side of potentiometer 22. The net effect is thus to shift potentiometer 22 closer in potential to terminal B without changing the resistance of the branch.

Figure 7:
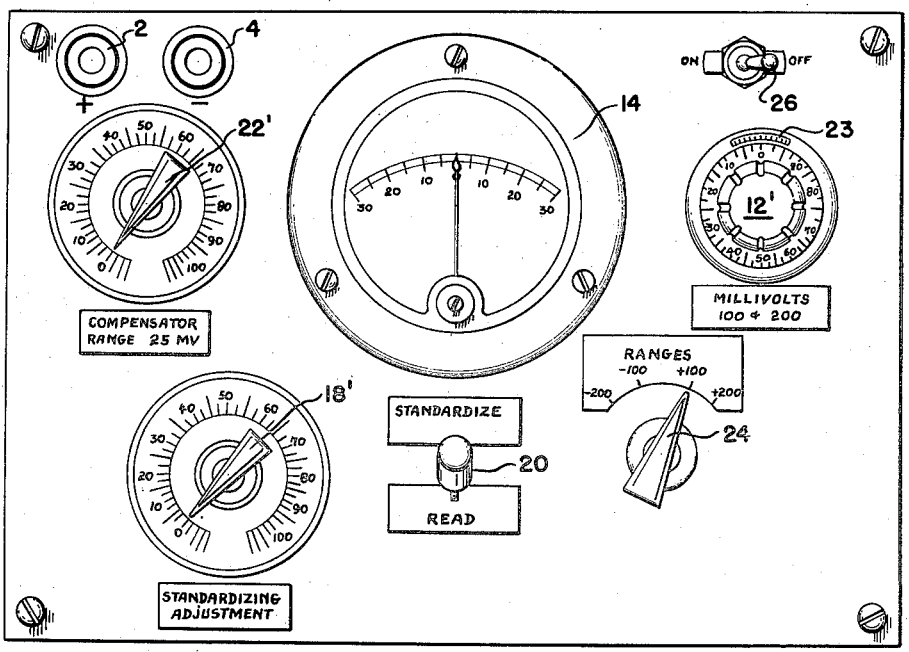
Fig. 7 is a plan view of the panel of an instrument according to the invention.

Fig. 7 shows the appearance of the control panel of one embodiment of the instrument of the invention as actually constructed. It carries the on-off switch 26, the instrument terminals 2 and 4 (which connect via galvanometer 14 with the sliders on potentiometers 12 and 22), a "standardize-read switch" 20 and the galvanometer 14 itself. It also carries a control 24' for ganged operation of switches 24a—f, a control 18' for the rheostat 18, and controls 12' and 22' for adjustment of the potentiometers 12 and 22.

For accuracy of readings, the potentiometer 12 advantageously takes the form of a multiple turn helical potentiometer, its slider making one turn on a helical slidewire for each revolution of the control 12'. Voltage increments corresponding to fractions of such a turn are read by comparison of graduations on the control with a fixed index mark on the panel while voltage increments corresponding to integral numbers of turns are read at a scale 23 which is seen through a window. The coupling of controls 12' and 22' to the sliders of potentiometers 12 and 22 is such that the readings of both controls are zero when the sliders of the potentiometers are at junctions G and H.

A successfully operating embodiment of the invention has been built with components of the following values:

| | |
|---|---|
| Battery 16_____volts__ | 1.5 |
| Battery rheostat 18_____ohms maximum__ | 50 |
| $R_1$ _____ohms__ | 2000 |
| $R_2$ _____do____ | 25 |
| $R_3$ _____do____ | 4½ |
| $R_4$ _____do____ | 200 |
| $R_5$ _____do____ | 100 |
| $R_6$ _____do____ | 50 |
| $R_7$ _____do____ | 100 |
| $R_8$ _____do____ | 25 |
| $R_9$ _____do____ | 125 |
| $R_{10}$ _____do____ | 100 |
| $R_{11}$ _____do____ | 12½ |
| $R_{12}$ _____do____ | 200 |
| $R_{13}$ _____do____ | 100 |
| Potentiometer 12_____do____ | 100 |
| Potentiometer 22_____do____ | 25 |

With these component values branches 30 and 32 possess for all configurations of the circuit the same resistance and each draws two ma., the rheostat 50 being adjusted to indicate a 4 ma. current in meter $M_1$. Furthermore for all configurations the current flowing through the compensating potentiometer 22 is of 1 ma., permitting compensation for initial voltage differences of 25 mv. applied at the instrument terminals. For the higher range of voltages and voltage changes measurable with the configurations of Figs. 3 and 4, the current through the measuring potentiometer 12 is of 2 ma., giving a range of voltage measurements of ±200 mv. For the smaller range of voltages the current through the measuring potentiometer is 1 ma., giving a range of voltage measurements of ±100 mv.

The component values just given illustrate a feature of the invention in a preferred form whereby the currents drawn from the measuring branch 30 and compensating branch 32 are separately the same for both ranges of measurement so that the instrument can be standardized with either range setting. They also illustrate another feature of the invention in a preferred form whereby the two branches draw the same current. This makes it convenient to use for $R_7$ and $R_{13}$ resistors of the same value.

In the embodiment illustrated the current through the compensating potentiometer 22 is the same for both ranges of voltages or voltage changes measurable at the potentiometer 12. Hence for both ranges compensation is available at potentiometer 22 for the same maximum initial voltage. Consistently with all other features of the invention which have been described however, the current passed through the compensating potentiometer may be made unequal on the two ranges, providing plural ranges of initial voltage for which compensation can be made as well as plural ranges of voltage change susceptible of measurement.

While the instrument of the invention has been described in conjunction with its use in the evaluation of corrosion inhibitors, it is clear that it may be used for measurements of voltage and voltage change unrelated to the evaluation of corrosion inhibitors.

I claim:

1. An instrument for measuring direct current voltages of opposite polarity comprising a pair of terminals across which the voltage to be measured may be applied, a source of direct current, two series circuits connected in shunt with said source, one of said circuits including two resistors in immediate series relation and the other including a series combination of a resistor and a potentiometer of equal resistance value, means to reverse in said other circuit the terminals of said combination, said circuits being proportioned to make the junctions of said series connected resistors in said one circuit and of said resistor and potentiometer in said other circuit points of equal potential with respect to said source, a connection between one of said terminals and the slider of said potentiometer, a connection between the other of said terminals and the junction of said resistors in said one circuit, and means to measure the flow of current between said terminals.

2. An instrument for measuring voltage changes comprising a first circuit branch including a source of potential difference and a resistor, second and third circuit branches connected across said first circuit branch, said second branch including a resistor, a series combination of a potentiometer and resistor of equal resistance value, and a reversing switch arranged to connect said combination in either direction into said second branch, said third branch including in series two resistors and a potentiometer between them, said branches being so proportioned that the potential drop from said source to the junction between the potentiometer and resistor of equal value in said second branch is equal to the potential drop from said source to one end of the potentiometer in said third branch, and means to apply a source of voltage difference to be measured in series with a current-measuring device between the sliders of said potentiometers.

3. An instrument for measuring changes of direct current voltage in either direction from an initial value comprising a source of direct current, an adjustable resistor in series with said source, a series combination of a first potentiometer and a resistor of equal value, a reversing switch arranged to connect said combination with the elements thereof in either order across said source and adjustable resistor, a series combination of a second potentiometer and resistor connected across said source and adjustable resistor, and means to apply a source of voltage difference to be measured in series with a current-measuring device between the sliders of said potentiometers.

4. An instrument for measuring by direct reading from a potentiometer changes in either direction from an initial value of direct current voltage differences, said instrument comprising a pair of terminals across which the voltages to be measured may be applied, two potentiometers having their sliders connected to said terminals, a source of direct current, two series circuits each including one of said potentiometers and a resistor, means connecting said circuits across said source, a reversing switch connected to permit reversal in one of said circuits of the potentiometer and series connected resistor therein, the said one potentiometer and its series connected resistor having equal resistance values, said circuits being so established that equal potential changes occur from said source to the junctions of said potentiometers and their series connected resistors when no current flows between the sliders of said potentiometers.

5. An instrument for measuring by direct reading from a potentiometer changes of either sign in a direct current voltage, said instrument comprising a first circuit branch including between two terminals a direct current potential source and an adjustable resistor in series therewith, second and third branches connected across said terminals, said second branch including a resistor and potentiometer of equal value in a series combination and means to reverse the connection of said combination in said second branch, said third branch including a resistor and potentiometer in series, means to apply a source of voltage difference to be measured in series with a current-measuring device between the sliders of said potentiometers, and separate pluralities of range-changing resistors associable with each of said second and third branches via a common control, at least one of said range-changing resistors being connected in parallel with said combination for one position of said control and effectively disconnected from said combination for another position of said control, the combined resistance of said second and third branches between said terminals being the same for all positions of said control and the junctions of said potentiometers with the resistors in their branches being for one current in said first branch points of equal potential with respect to said source for all positions of said control when no current flows between the sliders of said potentiometers, the potentiometer in said combination being calibrated from zero with its slider at the junction in said combination.

6. An instrument for measuring by direct reading from a potentiometer changes of either sign in a direct current voltage, said instrument comprising a first circuit branch including between two terminals a direct current potential source and an adjustable resistor in series therewith, second and third branches connected across said terminals, said second branch including a resistor and potentiometer of equal value in a series combination and means to reverse the connection of said combination in said second branch, said third branch including a resistor and potentiometer in series, means to apply a source of voltage difference to be measured in series with a current-measuring device between the sliders of said potentiometers, said branches being so dimensioned that for one current in said first branch the junctions between said potentiometers and the resistors in series therewith are at the same potential when no current passes between the sliders of said potentiometers, and means to simultaneously shunt said combination and the resistor in said third branch with separate resistances and to insert into said second and third branches additional resistance to maintain the resistances of said second and third branches unchanged, said shunting resistances being moreover dimensioned to preserve the equipotential relation of said junctions.

7. An instrument for measuring by direct reading from a potentiometer changes of either sign in a direct current voltage, said instrument comprising a first circuit branch including between two terminals a direct current potential source and an adjustable resistor in series therewith, second and third branches connected across said terminals, said second branch including a resistor and potentiometer of equal value in a series combination and means to reverse the connection of said combination in said second branch, said third branch including a resistor and potentiometer in series, means to apply a source of voltage difference to be measured in series with a current-measuring device between the sliders of said potentiometers, said second and third branches having equal resistance, and separate pluralities of range-changing resistors associable with each of said second and third branches via a common control, at least one of said range-changing resistors being connected in parallel with said combination for one position of said control and effectively disconnected from said combination for another position of said control, the resistances of said second and third branches between said terminals being the same for all positions of said control and the junctions of said potentiometers with the resistors in their branches being for one current in said first branch points of equal potential with respect to said source for all positions of said control when no current flows between the sliders of said potentiometers.

8. An instrument for measuring by direct reading from a potentiometer changes of either sign in a direct current voltage, said instrument comprising a first circuit branch including between two terminals a direct current potential source and an adjustable resistor in series therewith, second and third branches connected across said terminals, said second branch including a resistor and potentiometer of equal value in a series combination and means to reverse the connection of said combination in said second branch, said third branch including a resistor and potentiometer in series, means to apply a source of voltage difference to be measured in series with a current-measuring device between the sliders of said potentiometers, said second and third branches having equal resistance, said second and third branches being so dimensioned that for one current in said first branch the junctions between said potentiometers and the resistors in series therewith are at the same potential when no current passes between the sliders of said potentiometers, and means to simultaneously shunt said combination and the resistor in said third branch with separate resistances and to insert into said second and third branches additional resistance to maintain the resistances of said second and third branches unchanged, said shunting resistances being moreover dimensioned to preserve the equipotential relation of said junctions.

References Cited in the file of this patent
UNITED STATES PATENTS 2,277,365    Michael _____ Mar. 24, 1942
2,758,279    McCarron _____ Aug. 7, 1956